(12) United States Patent
Lin et al.

(10) Patent No.: US 8,289,002 B2
(45) Date of Patent: *Oct. 16, 2012

(54) MOTHER BOARD ADAPTED TO RAPIDLY CHARGE HANDHELD MULTIMEDIA DEVICE

(75) Inventors: Hou-Yuan Lin, Taipei Hsien (TW); Chen-Shun Chen, Taipei Hsien (TW); Tse-Hsine Liao, Taipei Hsien (TW); Kuei-Min Chen, Taipei Hsien (TW)

(73) Assignee: Giga-Byte Technology Co., Ltd., New Taipei (TW)

( * ) Notice: Subject to any disclaimer, the term of this patent is extended or adjusted under 35 U.S.C. 154(b) by 229 days.

This patent is subject to a terminal disclaimer.

(21) Appl. No.: 12/835,762

(22) Filed: Jul. 14, 2010

(65) Prior Publication Data

US 2011/0279093 A1  Nov. 17, 2011

(30) Foreign Application Priority Data

May 14, 2010  (TW) .............................. 99115512 A

(51) Int. Cl.
*H02J 7/00* (2006.01)

(52) U.S. Cl. ......... 320/160; 320/106; 320/112; 320/114

(58) Field of Classification Search .................. 320/106, 320/112, 114, 160
See application file for complete search history.

(56) References Cited

U.S. PATENT DOCUMENTS

| 2007/0108938 A1* | 5/2007 | Veselic ........................ 320/111 |
| 2008/0024089 A1* | 1/2008 | Meng et al. .................... 320/128 |
| 2008/0309313 A1* | 12/2008 | Farrar et al. .................... 323/351 |

* cited by examiner

*Primary Examiner* — Samuel Berhanu
(74) *Attorney, Agent, or Firm* — Chun-Ming Shih

(57) ABSTRACT

A mother board adapted to rapidly charge a handheld multimedia device including a controller, a rapid charging initiation unit, a connection port coupled to the handheld multimedia device, and a switching unit. The rapid charging initiation unit provides a first voltage ranging from 3.2 V to 11 V and a second voltage ranging from 2.7 V to 0.6 V. A voltage difference between the first voltage and the second voltage ranges from 0.5 V to 0.8 V. The switching unit is coupled to the controller, the rapid charging initiation unit, and the connection port for determining whether the connection port is coupled to the controller or the rapid charging initiation unit. When the connection port is coupled to the rapid charging initiation unit, the first and the second voltage are sent to the handheld multimedia device through the connection port for activating a rapid charging function.

7 Claims, 1 Drawing Sheet

MOTHER BOARD ADAPTED TO RAPIDLY CHARGE HANDHELD MULTIMEDIA DEVICE

CROSS-REFERENCE TO RELATED APPLICATION

This application claims the priority benefit of Taiwan application serial no. 99115512, filed on May 14, 2010. The entirety of the above-mentioned patent application is hereby incorporated by reference herein and made a part of this specification.

BACKGROUND OF THE INVENTION

1. Field of the Invention

The invention is related to a mother board and particularly to a mother board adapted to rapidly charge a handheld multimedia device.

2. Description of Related Art

Recently, the use of multimedia devices has become popularized with the rapid growth of digital cameras, MP3s, and MP4s. In addition, multimedia devices can connect with personal computers to receive data therefrom or send data thereto. Multimedia devices can usually connect to connection ports of personal computers through connection lines. Consequently, multimedia devices and personal computers can transmit data to each other. Here, connection ports are, for example, universal serial bus (USB) connection ports. When data is transmitted between multimedia devices and PCs, batteries of some multimedia devices can also be charged by receiving power from PCs through connection ports. Charging multimedia devices through PCs has become more common due to the popularization of PCs. The manner of rapid charging multimedia devices through PCs is thus important.

SUMMARY OF THE INVENTION

The invention is directed to a mother board adapted to rapidly charge a handheld multimedia device, where the mother board is capable of activating a rapid charging function of the handheld multimedia device.

The invention is directed to a mother board adapted to rapidly charge a handheld multimedia device, where the mother board including a controller, a rapid charging initiation unit, a connection port, and a switching unit. The controller is configured to output or receive a data signal. The rapid charging initiation unit provides a first voltage and a second voltage. The first voltage ranges from 3.2 V to 1.1 V, the second voltage ranges from 2.7 V to 0.6 V, and a voltage difference between the first voltage and the second voltage ranges from 0.5 V to 0.8 V. The connection port is coupled to the handheld multimedia device. The switching unit is coupled to the controller, the rapid charging initiation unit, and the connection port so as to determine whether the connection port is coupled to the controller or the rapid charging initiation unit according to a switching signal. When the connection port is coupled to the rapid charging initiation unit, the first voltage and the second voltage are sent to the handheld multimedia device through the connection port for activating the rapid charging function of the handheld multimedia device.

In an embodiment of the invention, the rapid charging initiation unit includes a first resistor, a second resistor, a third resistor, and a fourth resistor. The first resistor has a first terminal coupled to a system voltage and a second terminal outputting the first voltage. The second resistor has a first terminal coupled to the second terminal of the first resistor and a second terminal coupled to a ground voltage. The third resistor has a first terminal coupled to the system voltage and a second terminal outputting the second voltage. The fourth resistor has a first terminal coupled to the second terminal of the third resistor and a second terminal coupled to the ground voltage.

In an embodiment of the invention, the transmittance of the switching signal is determined by the setting of a basic input-output system (BIOS).

In an embodiment of the invention, the connection port is a universal serial bus (USB) connection port and the controller is a USB controller.

In an embodiment of the invention, the first voltage and the second voltage are sent to the handheld multimedia device via a first data pin and a second data pin of the connection port respectively.

In an embodiment of the invention, the switching unit pre-couples the controller to the connection port.

In an embodiment of the invention, the handheld multimedia device is an iPad or iPod.

In light of the foregoing, the switching unit in the mother board adapted to rapidly charge a handheld multimedia device of the invention couples the connection port to the controller or the rapid charging initiation unit according to the switching signal. When the connection port is coupled to the rapid charging initiation unit, the first voltage and the second voltage of the rapid charging initiation unit are sent to the handheld multimedia device for activating the rapid charging function of the handheld multimedia device, so as to increase the charging speed of the handheld multimedia device.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
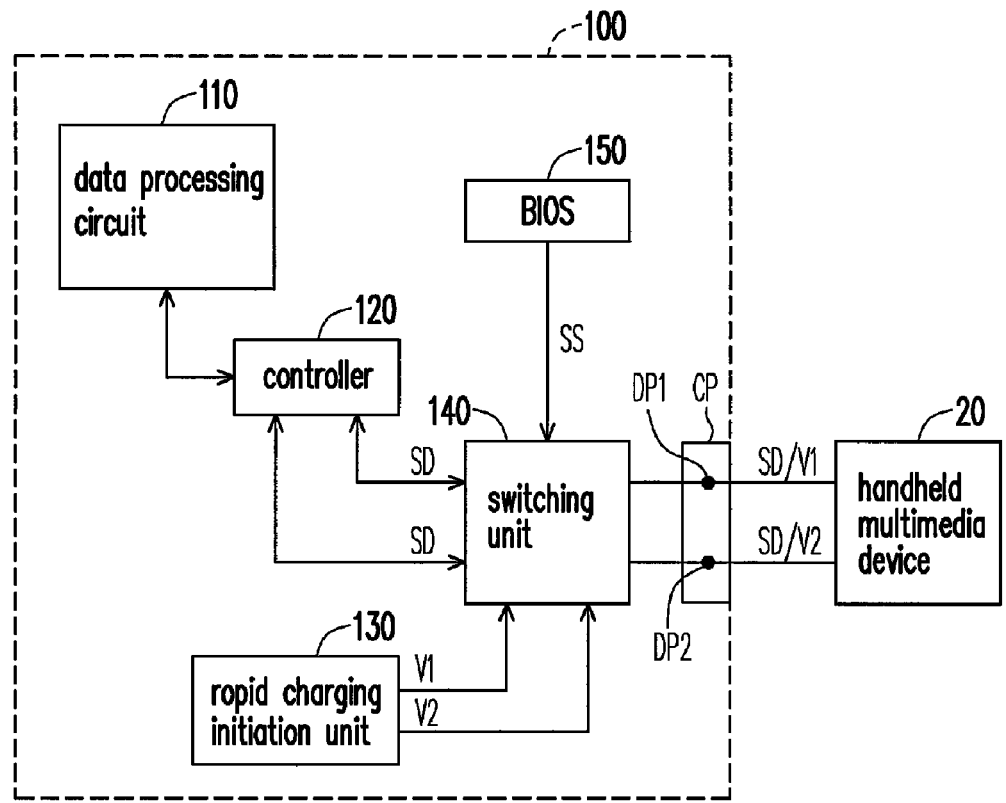
FIG. 1 is a block diagram depicting a system of a mother board coupled to a handheld multimedia device according to an embodiment of the invention.

FIG. 1 is a block diagram depicting a system of a mother board coupled to a handheld multimedia device according to an embodiment of the invention. Referring to FIG. 1, in the present embodiment, a mother board 100 includes a data processing circuit 110, a controller 120, a rapid charging initiation unit 130, a switching unit 140, a basic input-output system (BIOS) 150, and a connection port CP. The data processing circuit 110 is configured to process data transmitted from the controller 120 or transmit data to the controller 120. Here, the data processing circuit 110 is disposed with devices required for data processing, such that the data processing circuit 110 has data processing ability. The devices included in the data processing circuit 110 are known to persons skilled in the art, and thus not repeated hereinafter.

After receiving data transmitted from the data processing circuit 110, the controller 120 outputs a data signal SD, where the data signal SD is a differential signal. On the contrary, after receiving the data signal SD, the controller 120 outputs data to the data processing circuit 110. The rapid charging initiation unit 130 is configured to provide a first voltage V1 and a second voltage V2. The first voltage V1 ranges from 3.2 V to 1.1 V, the second voltage V2 ranges from 2.7 V to 0.6 V, and a voltage difference between the first voltage V1 and the second voltage V2 ranges from 0.5 V to 0.8 V. In addition, the first voltage V1 and the second voltage V2 are configured to active the rapid charging function of a handheld multimedia device 20. Herein, the handheld multimedia device 20 is an iPad or iPod, for instance. The connection port CP is coupled to the handheld multimedia device 20.

The switching unit 140 is coupled to the controller 120, the rapid charging initiation unit 130, and the connection port CP. The switching unit 140 determines whether the connection port CP is coupled to the controller 120 or the rapid charging initiation unit 130 according to a switching signal SS. Moreover, the switching unit 140 pre-couples the controller 120 to the connection port CP. The switching signal SS in the present embodiment is transmitted from the BIOS, where the switching signal SS is determined by the setting stored in the BIOS. However, in other embodiments, the switching signal SS can be transmitted from a control circuit or a switch, where the switching signal SS is determined by the setting of the control circuit or the switch. When the connection port CP is a universal serial bus (USB) connection port, then the controller 120 is correspondingly a USB controller.

When the connection port CP is coupled to the rapid charging initiation unit 130, the first voltage V1 and the second voltage V2 are sent to the handheld multimedia device 20 through the connection port CP for activating the rapid charging function of the handheld multimedia device 20. In details, the first voltage V1 of the rapid charging initiation unit 130 is transmitted to a first data pin DP1 of the connection port CP through the switching unit 140, so that the first voltage V1 is transmitted to the handheld multimedia device 20 via the first data pin DP1. Further, the second voltage V2 of the rapid charging initiation unit 130 is transmitted to a second data pin DP2 of the connection port CP through the switching unit 140, so that the second voltage V2 is transmitted to the handheld multimedia device 20 via the second data pin DP2. The first data pin DP1 is a positive data (D+) pin of the USB connection port and the second data pin DP2 is a negative data (D−) pin of the USB connection port.

When the connection port CP is coupled to the controller 120, the controller 120 outputs the data signal SD to the handheld multimedia device 20 through the connection port CP or receives the data signal SD transmitted from the handheld multimedia device 20. Specifically, the data signal SD of the controller 120 is transmitted to the handheld multimedia device 20 via the first data pin DP1 and the second data pin DP2. The data signal SD of the handheld multimedia device 20 is transmitted to the controller 120 via the first data pin DP1 and the second data pin DP2.

Accordingly, when the handheld multimedia device 20 is coupled to the connection port CP, the switching unit 140 determines whether the connection port CP is coupled to the controller 120 or the rapid charging initiation unit 130 according to the switching signal SS. When the connection port CP is coupled to the controller 120, data is transmitted between the handheld multimedia device 20 and the data processing circuit 110. Moreover, the handheld multimedia device 20 can receive power from the mother board 100 to undergo regular charging of battery. When the connection port CP is coupled to the rapid charging initiation unit 130, the handheld multimedia device 20 receives the first voltage V1 and the second voltage V2 of the rapid charging initiation unit 130 to active the rapid charging function. As a result, the handheld multimedia device 20 then receives power from the mother board 100 to undergo rapid charging of the battery.

Figure 2:
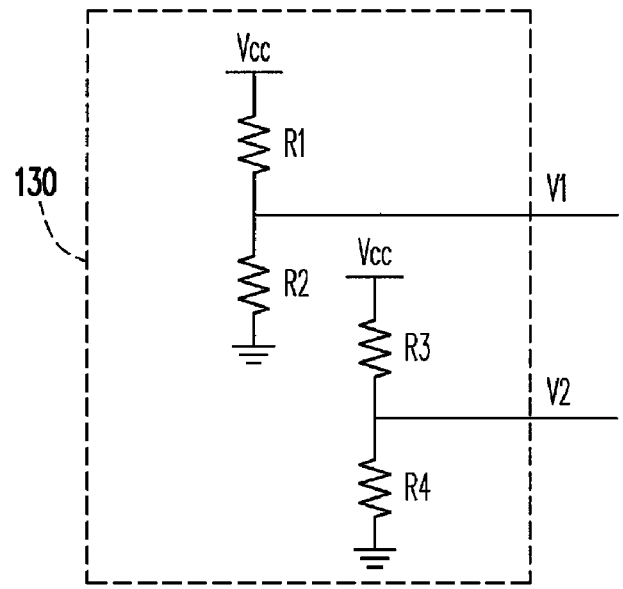
FIG. 2 is a circuit diagram of a rapid charging initiation unit illustrated in FIG. 1.

FIG. 2 is a circuit diagram of a rapid charging initiation unit illustrated in FIG. 1. Referring to FIG. 2, in the present embodiment, the rapid charging initiation unit 130 includes a first resistor R1, a second resistor R2, a third resistor R3, and a fourth resistor R4. The first resistor R1 has a first terminal coupled to a system voltage Vcc and a second terminal outputting the first voltage V1. The second resistor R2 has a first terminal coupled to the second terminal of the first resistor R1 and a second terminal coupled to a ground voltage. The third resistor R3 has a first terminal coupled to the system voltage Vcc and a second terminal outputting the second voltage V2. The fourth resistor R4 has a first terminal coupled to the second terminal of the third resistor R3 and a second terminal coupled to the ground voltage. Herein, the system voltage Vcc is an operation voltage or a standby voltage of the mother board 100.

In summary, the switching unit in the mother board of the invention couples the connection port to the controller or the rapid charging initiation unit according to the switching signal. When the connection port is coupled to the rapid charging initiation unit, the first voltage and the second voltage of the rapid charging initiation unit are sent to the handheld multimedia device for activating the rapid charging function of the handheld multimedia device, so as to increase the charging speed of the handheld multimedia device.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A mother board adapted to rapidly charge a handheld multimedia device, comprising:
    a controller, configured to output or receive a data signal;
    a rapid charging initiation unit, providing a first voltage and a second voltage, wherein the first voltage ranges from 3.2 Volts (V) to 1.1 V, the second voltage ranges from 2.7 V to 0.6 V, and a voltage difference between the first voltage and the second voltage ranges from 0.5 V to 0.8 V;
    a connection port, coupled to the handheld multimedia device; and
    a switching unit, coupled to the controller, the rapid charging initiation unit, and the connection port so as to determine whether the connection port is coupled to the controller or the rapid charging initiation unit according to a switching signal, wherein when the connection port is coupled to the rapid charging initiation unit, the first voltage and the second voltage are sent to the handheld multimedia device through the connection port to activate a rapid charging function of the handheld multimedia device.

2. The mother board adapted to rapidly charge the handheld multimedia device as claimed in claim 1, wherein the rapid charging initiation unit comprises:
    a first resistor, having a first terminal coupled to a system voltage and a second terminal outputting the first voltage;
    a second resistor, having a first terminal coupled to the second terminal of the first resistor and a second terminal coupled to a ground voltage;

a third resistor, having a first terminal coupled to the system voltage and a second terminal outputting the second voltage; and a fourth resistor, having a first terminal coupled to the second terminal of the third resistor and a second terminal coupled to the ground voltage.

3. The mother board adapted to rapidly charge the handheld multimedia device as claimed in claim 1, wherein whether the switching signal is transmitted depends on a setting of a basic input-output system (BIOS).

4. The mother board adapted to rapidly charge the handheld multimedia device as claimed in claim 1, wherein the connection port is a universal serial bus (USB) connection port and the controller is a USB controller.

5. The mother board adapted to rapidly charge the handheld multimedia device as claimed in claim 4, wherein the first voltage and the second voltage are sent to the handheld multimedia device via a first data pin and a second data pin of the connection port respectively.

6. The mother board adapted to rapidly charge the handheld multimedia device as claimed in claim 1, wherein the switching unit pre-couples the controller to the connection port.

7. The mother board adapted to rapidly charge the handheld multimedia device as claimed in claim 1, wherein the handheld multimedia device is an iPad or an iPod.

* * * * *